United States Patent
Horesh

(10) Patent No.: US 12,286,249 B2
(45) Date of Patent: Apr. 29, 2025

(54) TECHNIQUES FOR NAVIGATION AND FOR ESTIMATING VISUAL NAVIGATION PERFORMANCE

(71) Applicant: R-Go Robotics Ltd., Caesarea (IL)

(72) Inventor: Nizan Horesh, Caesarea (IL)

(73) Assignee: R-Go Robotics Ltd., Caesarea (IL)

( * ) Notice: Subject to any disclaimer, the term of this patent is extended or adjusted under 35 U.S.C. 154(b) by 299 days.

(21) Appl. No.: 17/932,893

(22) Filed: Sep. 16, 2022

(65) Prior Publication Data

US 2024/0094002 A1    Mar. 21, 2024

(51) Int. Cl.
| | |
|---|---|
| *B64U 10/13* | (2023.01) |
| *B64U 101/30* | (2023.01) |
| *G01C 21/20* | (2006.01) |

(52) U.S. Cl.
CPC .......... *B64U 10/13* (2023.01); *G01C 21/20* (2013.01); *B64U 2101/30* (2023.01)

(58) Field of Classification Search
CPC .. G01C 21/20; B64C 39/024; B64U 2101/30; B64U 10/13
See application file for complete search history.

(56) References Cited

U.S. PATENT DOCUMENTS

| | | | |
|---|---|---|---|
| 6,915,205 B2 | 7/2005 | Kim et al. | |
| 7,193,559 B2 | 3/2007 | Ford et al. | |
| 7,561,961 B2 | 7/2009 | Wakamatsu et al. | |
| 8,340,905 B2 | 12/2012 | Roberts et al. | |
| 8,649,977 B2 | 2/2014 | Toda | |
| 11,145,076 B1* | 10/2021 | Horesh | G06T 7/74 |
| 2012/0086598 A1 | 4/2012 | Aghili | |
| 2014/0375495 A1 | 12/2014 | Fleming et al. | |
| 2021/0048825 A1* | 2/2021 | Elvitigala | B60W 60/0023 |
| 2022/0332349 A1* | 10/2022 | Benou | G01C 21/20 |
| 2023/0117712 A1* | 4/2023 | Jaber | G06F 18/23 |
| | | | 382/203 |

(Continued)

OTHER PUBLICATIONS

"A Critical Evaluation of Aerial Datasets for Semantic Segmentation", B. Blaga et al., 2020 IEEE 16th International Conference on Intelligent Computer Communication and Processing (ICCP) (2020, pp. 353-360) (Year: 2020).*

(Continued)

*Primary Examiner* — Michael V Kerrigan
*Assistant Examiner* — Tanya C Sienko
(74) *Attorney, Agent, or Firm* — M&B IP Analysts, LLC

(57) ABSTRACT

A system and method for path navigation accuracy estimation. A method includes determining a degree of obstruction for each of a plurality of objects shown in visual content, wherein the degree of obstruction for each object represents a degree to which the object will obstruct visibility by a vehicle capturing visual content in an environment where the vehicle is navigating and the plurality of objects are disposed; determining, for each of a plurality of operational points, a co-visibility of the vehicle at the operational point based on a pose of the vehicle at the operational point and the degree of obstruction for each of the objects which is within view of the vehicle at the operational point; and estimating a visual navigation performance at each of the operational points based on the co-visibility determined for the operational point.

17 Claims, 6 Drawing Sheets

(56) References Cited

U.S. PATENT DOCUMENTS

2023/0366696 A1* 11/2023 Vogel .................. G01C 21/3848
2024/0104771 A1*  3/2024 Zelek ...................... G06T 7/579

OTHER PUBLICATIONS

"Semantic Segmentation: A Complete Guide" G. Sharma, published in Towards AI Oct. 6, 2021 (Year: 2021).*
"Utilizing Semantic Visual Landmarks for Precise Vehicle Navigation" by V. Murali et al., ArXiv ID: 1801.00858 published Jan. 2, 2018 (Year: 2018).*
"Probabilisitic Place Recognition with Covisibility Maps" E. Stumm et al. 2013 IEEE/RSJ International Conference on Intelligent Robots and Systems (IROS) Nov. 3-7, 2013. Tokyo, Japan (Year: 2013).*
"Occlusion-Aware Risk Assessment for Autonomous Driving in Urban Environments" by M. Yu, et al., IEEE Robotics and Automation Letters, vol. 4, No. 2, Apr. 2019 pp. 2235-2241 (Year: 2019).*
"Visibility Estimation in Complex, Real-World Driving Environments Using High Definition Maps" by P. Narksri et al., 2021 IEEE Intelligent Transportation Systems Conference (ITSC) Indianapolis, USA Sep. 19-21, 2021 (Year: 2021).*

* cited by examiner

TECHNIQUES FOR NAVIGATION AND FOR ESTIMATING VISUAL NAVIGATION PERFORMANCE

TECHNICAL FIELD

The present disclosure relates generally to navigation of vehicles, and more specifically to estimating navigation performance for use in improving navigation of vehicles.

BACKGROUND

Vehicles and, in particular, unmanned aerial vehicles such as drones, often rely on navigation software in order to make navigation decisions to reach a destination. Successful navigation without crashing or otherwise causing damage to the vehicle or its surroundings requires accurate decision making. The navigation software utilized by most drones involves analysis of images taken by cameras installed on the drones. Various factors such as obstructions, light, variations in color, at a particular location can all affect how accurately the images captured by the drone reflect the actual location and, consequently, the accuracy of the data used for making navigation decisions. Using inaccurate or otherwise unrepresentative data when making navigation decisions can lead to disastrous navigation decisions which may result in accident or injury.

Additionally, when a robot or other vehicle designed to perform non-navigation tasks is deployed in an area, decisions related to performing those tasks are frequently made based on visual content such as images captured by the robot. Like for navigation, using inaccurate images or images that otherwise do not reflect the actual environments in which they are deployed may result in incorrect decision making.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for path navigation accuracy estimation. The method comprises: determining a degree of obstruction for each of a plurality of objects shown in visual content, wherein the degree of obstruction for each object represents a degree to which the object will obstruct visibility by a vehicle capturing visual content in an environment where the vehicle is navigating and the plurality of objects are disposed; determining, for each of a plurality of operational points, a co-visibility of the vehicle at the operational point based on a pose of the vehicle at the operational point and the degree of obstruction for each of the objects which is within view of the vehicle at the operational point; and estimating a visual navigation performance at each of the operational points based on the co-visibility determined for the operational point.

Certain embodiments disclosed herein also include a non-transitory computer readable medium having stored thereon causing a processing circuitry to execute a process, the process comprising: determining a degree of obstruction for each of a plurality of objects shown in visual content, wherein the degree of obstruction for each object represents a degree to which the object will obstruct visibility by a vehicle capturing visual content in an environment where the vehicle is navigating and the plurality of objects are disposed; determining, for each of a plurality of operational points, a co-visibility of the vehicle at the operational point based on a pose of the vehicle at the operational point and the degree of obstruction for each of the objects which is within view of the vehicle at the operational point; and estimating a visual navigation performance at each of the operational points based on the co-visibility determined for the operational point.

Certain embodiments disclosed herein also include a system for path navigation accuracy estimation. The system comprises: a processing circuitry; and a memory, the memory containing instructions that, when executed by the processing circuitry, configure the system to: determine a degree of obstruction for each of a plurality of objects shown in visual content, wherein the degree of obstruction for each object represents a degree to which the object will obstruct visibility by a vehicle capturing visual content in an environment where the vehicle is navigating and the plurality of objects are disposed; determine, for each of a plurality of operational points, a co-visibility of the vehicle at the operational point based on a pose of the vehicle at the operational point and the degree of obstruction for each of the objects which is within view of the vehicle at the operational point; and estimate a visual navigation performance at each of the operational points based on the co-visibility determined for the operational point.

BRIEF DESCRIPTION OF THE DRAWINGS

The subject matter disclosed herein is particularly pointed out and distinctly claimed in the claims at the conclusion of the specification. The foregoing and other advantages of the disclosed embodiments will be apparent from the following detailed description taken in conjunction with the accompanying drawings.

DETAILED DESCRIPTION

Figure 1A:
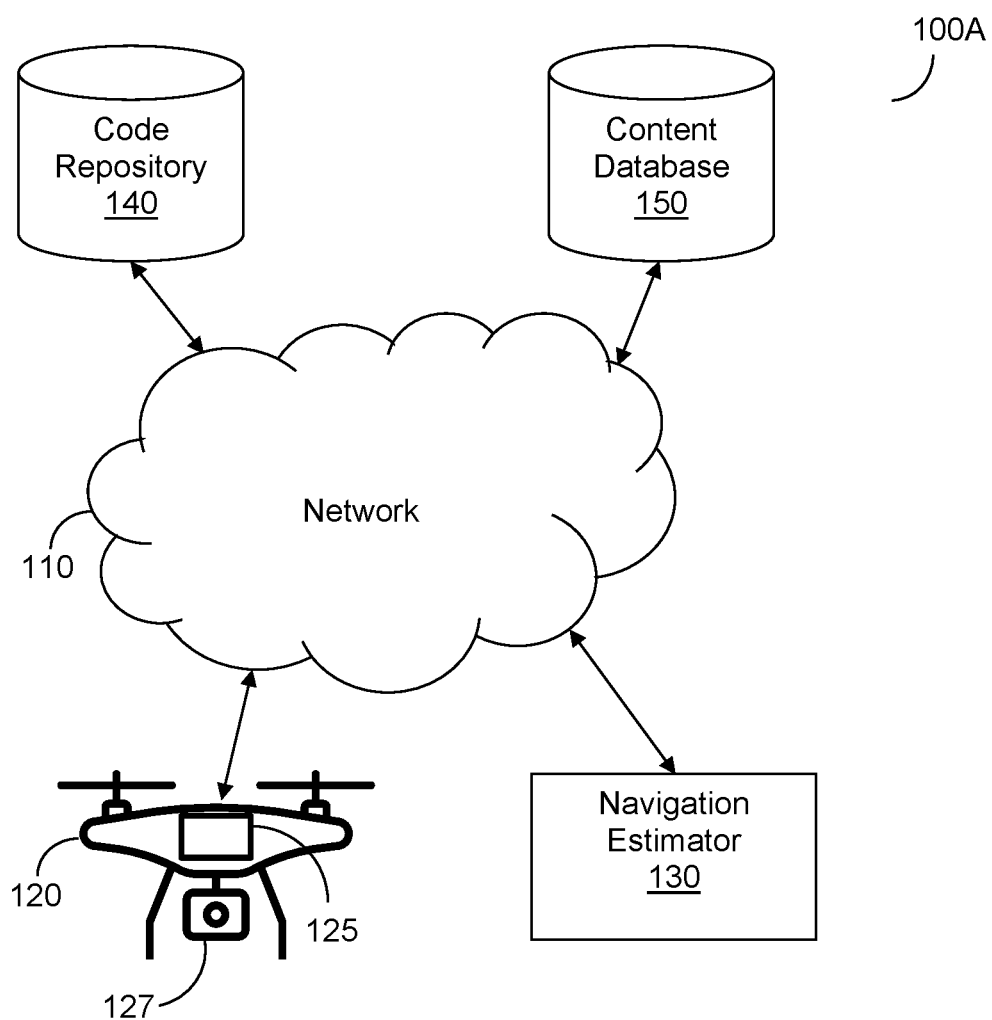
FIGS. 1A-B are network diagrams utilized to describe various disclosed embodiments.

In light of the challenges noted above, it has been identified that the ability to effectively determine how accurate navigation decisions can be made at a given location can be used to improve navigation and other logistical decisions such as decisions on whether to use particular navigation software for optimal navigation. Accordingly, the various disclosed embodiments provide techniques for estimating quality and accuracy of visual navigation using visual content such as images captured by a vehicle or other moving system. The various disclosed embodiments provide techniques for determining accuracy which improve estimations of accuracy, which in turn is utilized to improve decision-making relying on such estimations of accuracy. The disclosed embodiments further include techniques for image processing used to facilitate accuracy estimation.

In an embodiment, visual content is analyzed using semantic segmentation to identify points of interest in the visual content. Objects shown in the visual content are identified, and a degree of obstruction for each identified object is determined using semantic segmentation based on the visual content showing the object. A distance from a vehicle to each identified object is determined for various operational points where the vehicle will navigate, and a co-visibility between the vehicle and each identified object at each operational point is determined based on a field-of-view of the scene including distances to the objects shown in the visual content as well as the degree of obstruction. An accuracy of navigation-related calculations such as localization calculations is determined for paths including the operational points by accounting for both drift and prior relocalization events. An estimated navigation performance of the vehicle may be determined for the different paths.

The estimated navigation performance of the vehicle may be used to improve navigation of the vehicle in one or more ways. In particular, the software used for navigation may be selected based on estimations of navigation performance made using historical variance and drift obtained via testing using different navigation software. Alternatively or together, a path for navigation may be planned based on the estimated navigation performance at any particular point and the vehicle may be instructed to navigate along this path in order to optimize navigation decisions. In particular, the path may be planned in order to avoid locations where the navigation performance is unacceptably low (e.g., below a threshold) or otherwise plan the path to optimize navigation by having the vehicle navigate through locations where navigation performance is higher. To this end, in various embodiments, an average accuracy along a proposed path may be determined and compared to a required average accuracy in order to determine whether the vehicle navigating along the proposed path will meet the required average accuracy and, if not, another path having a higher average accuracy may be selected.

Further, the estimated navigation performance may be used when making navigation decisions. For example, when the estimated navigation performance is low (e.g., below a threshold), more conservative navigation decisions may be made (e.g., decisions which leave more time for turning or leave more space between the vehicle and obstacles) in order to reduce the chance of collision. As another example, when the estimated navigation performance is high (e.g., above a threshold), more liberty may be taken with navigation decisions which minimize the time or distance traveled.

In particular, the disclosed embodiments may be utilized to predict accuracy of localization techniques such as simultaneous localization and mapping (SLAM) at various points which a vehicle is expected to occupy during navigation. SLAM techniques allow for both mapping an environment around a vehicle as well as determine how much movement is needed to reach a required next location based on that mapped environment. Accordingly, using the disclosed techniques to estimate the accuracy of SLAM techniques consequently lends to determining a likelihood that navigation decisions made based on results of SLAM analyses will be correct.

This information about whether navigation decisions will likely be correct may aid in navigation, for example, by selecting appropriate software to be used for navigation (e.g., software that will provide the most accurate localization and, therefore, the best navigation decisions) or otherwise by adapting navigation to account for potential inaccuracies in localization (e.g., by planning a navigation path which ensures that the average accuracy of image-based decisions made during navigation along the path will meet a threshold).

The disclosed embodiments further utilize characteristics of relocalization drift and relocalization variance that results in more accurate estimations of navigation performance, thereby allowing for improving navigation decisions of a vehicle. More specifically, as discussed further below, the effects of post-relocalization drift tend to decrease accuracy of localization calculations as the vehicle moves away from the location of the last relocalization event. The accuracy increases immediately after a new relocalization event occurs. When the accuracy of localization decreases, the position of the vehicle relative to the environment in which it operates is less accurate. As a result, navigation decisions which rely on the position of the vehicle relative to the environment (e.g., steering to avoid obstacles) are determined less effectively as the vehicle moves away from the location of the last relocalization event.

Accordingly, by accounting for the path length (i.e., the distance traveled) since the last relocalization event and determining a combined effect of relocalization drift and relocalization variance with respect to the last relocalization event, navigation performance can be more accurately estimated. By using these more accurate navigation performance estimations, more effective decisions related to navigating the vehicle may be determined in order to improve navigation of the vehicle. In particular, paths may be planned in order to ensure that the accuracy maintains a required level (e.g., a threshold average accuracy over the path, a minimum threshold accuracy for any given point along the path, both, and the like). Alternatively or additionally, the vehicle may navigate more efficiently (e.g., by making tighter turns or otherwise minimizing the distance traveled or time spent traveling), more safely (i.e., by reducing the chance of collision with obstacles), or both.

Figure 1B:
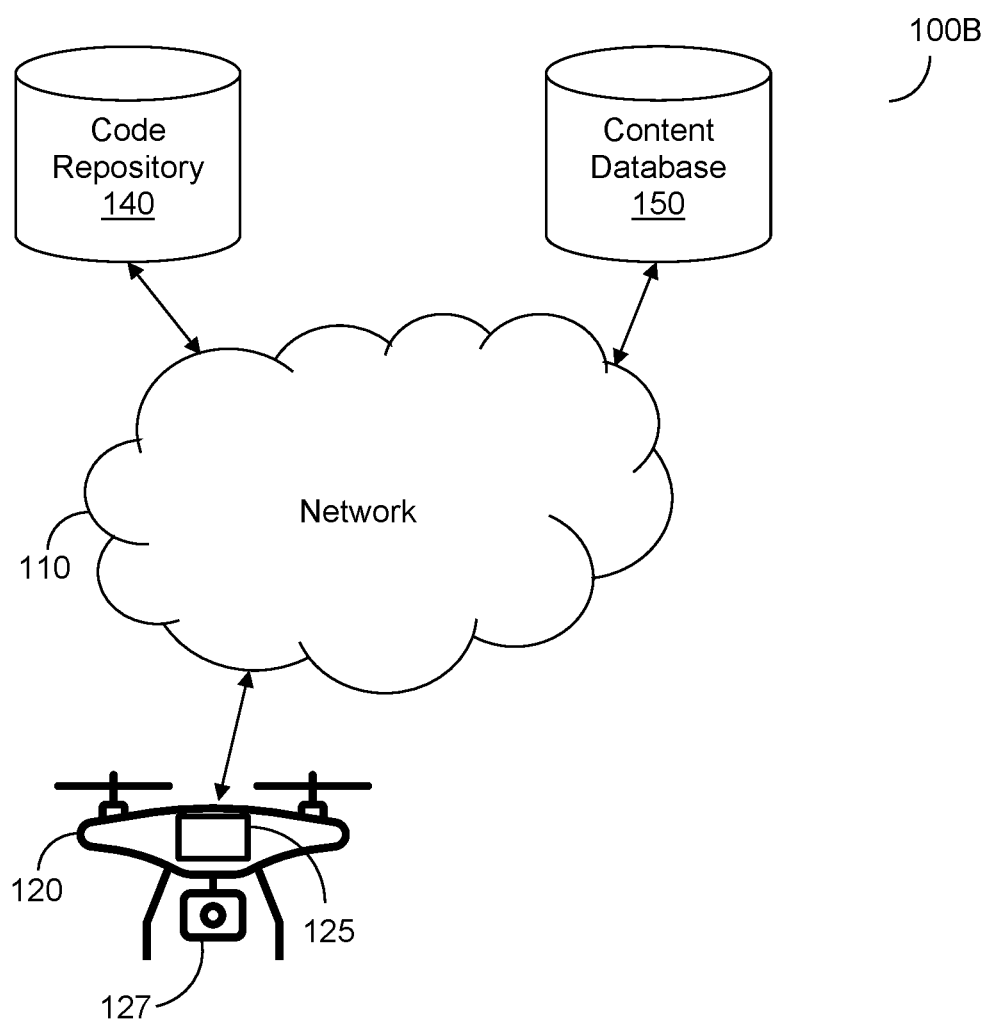

FIGS. 1A-B show example network diagrams 100A-B utilized to describe various disclosed embodiments. In particular, FIG. 1A depicts an embodiment in which at least a portion of the disclosed embodiments are performed by a remote system such as a navigation estimator 130, and FIG. 1B depicts an embodiment in which the disclosed techniques are performed by a vehicle navigation system 125 installed on a vehicle 120.

In the example network diagram 100A, a vehicle 120, a navigation estimator 130, a code repository 140, and a content database 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As noted above, FIG. 1A illustrates a network diagram 100A in which a vehicle 120 communicates with a navigation estimator 130 that is configured to perform at least a portion of the disclosed embodiments related to estimating navigation accuracy. In the non-limiting example implementation depicted in FIG. 1A, the vehicle 120 is a drone having installed thereon a navigation system 125 and a camera 127. The navigation system 125 is configured to make navigation decisions and to cause the vehicle 120 to move in accordance with those navigation decisions. To this end, the navigation system 125 may be configured to plan paths for navigation based on accuracy estimates as described herein. The camera 127 is configured to capture visual content such as images of environments in which the vehicle 120 navigates. That visual content may be used to, for example, make navigation decisions, perform navigation estimation, both, and the like.

Each of the vehicle 120 and the navigation estimator 130 may further communicate with a code repository 140, a content database 150, or both. The code repository 140 may store software in the form of code containing instructions for at least navigating. In some embodiments noted below, the navigation software to be utilized for making navigation decisions for the vehicle 120 may be selected based on estimations of navigation accuracy in an environment where the vehicle 120 is or will be navigating. The content database 150 may store previously captured visual content illustrating potential environments in which the vehicle 120 (or other vehicles) might navigate and for which navigation accuracy estimations may be performed. Such visual content may include, but is not limited to, images, videos, both, and the like. In some implementations, visual content captured by the vehicle 120 may be stored in the content database 150, for example, to allow the navigation estimator 130 to access such visual content via the content database 150 instead of by communicating with the vehicle 120. The content database may store publicly or privately accessible visual media content at least showing environments in which vehicles may navigate.

FIG. 1B depicts an implementation 100B in which the vehicle 120 does not communicate with a separate navigation estimator 130. In such an example implementation, the navigation system 125 may be configured to perform one or more of the disclosed embodiments for estimating navigation accuracy, and may make navigation-related decisions based on the results.

Figure 2:
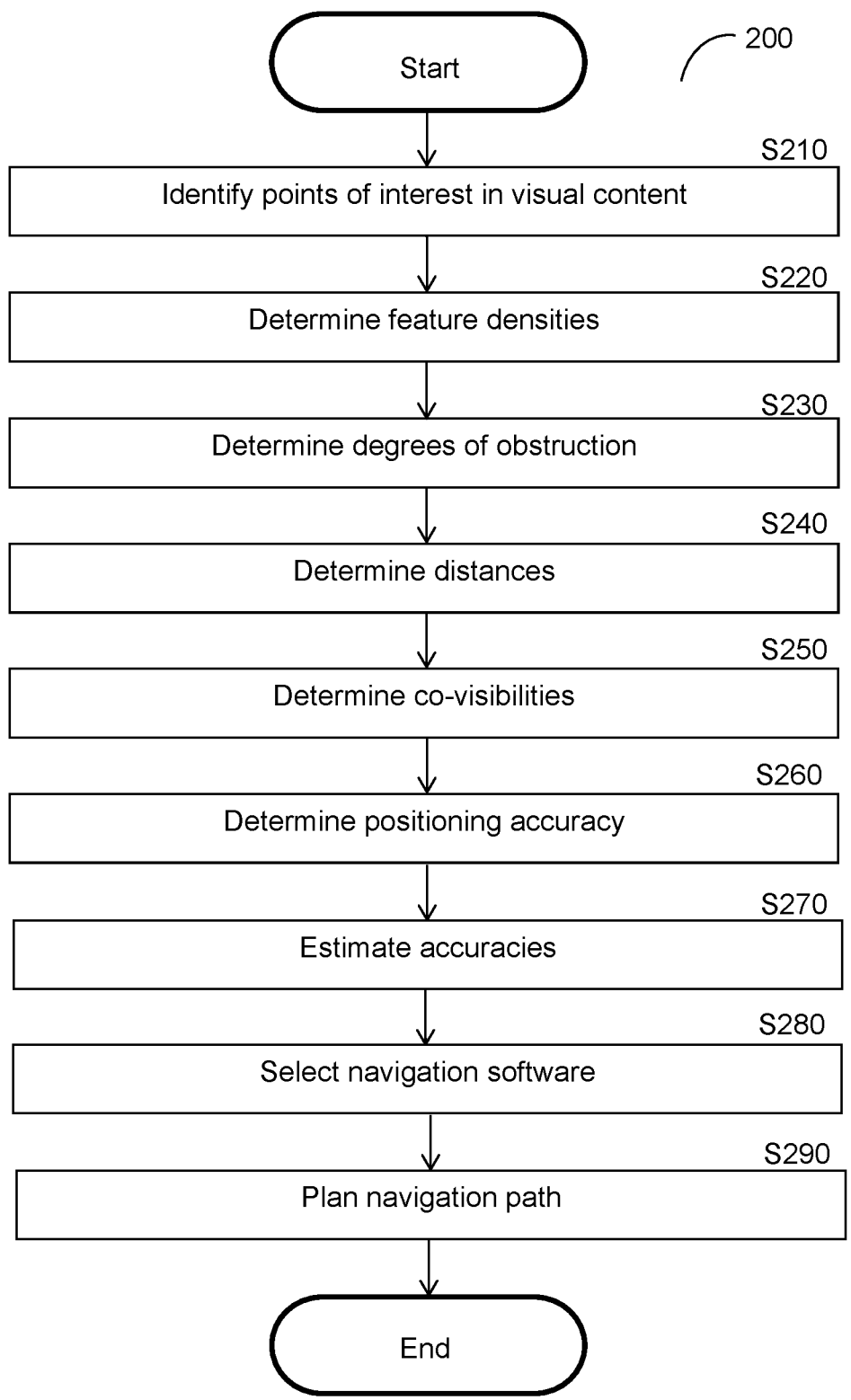
FIG. 2 is a flowchart illustrating a method for path planning using estimates of visual navigation performance according to an embodiment.

FIG. 2 is a flowchart 200 illustrating a method for path planning using estimates of visual navigation performance according to an embodiment. In an embodiment, the method is performed by the navigation estimator 130 or the vehicle navigation system 125, FIGS. 1A-B.

At S210, visual content captured by cameras of one or more vehicles deployed in an environment is analyzed to identify points of interest within the environment. The visual content may include, but is not limited to, images or video. In an embodiment, S210 may further include receiving the visual content from the vehicle (e.g., at the navigation estimator 130), capturing the visual content by the vehicle (e.g., by the vehicle 120), or retrieving the visual content from a database (e.g., from the content database 150). As a non-limiting example, the visual content may include aerial images captured by one or more drones flying in an environment. In an embodiment, S220 includes performing semantic segmentation on the visual content.

The visual content illustrates an area in which a vehicle may operate and in which the vehicle will capture visual content to be used for navigation. The visual content may show structures or other properties of the environment which may include, but are not limited to, houses or other buildings, trees, open areas, telephone poles, mountainous terrain, grass, other objects which might serve as potential obstacles (i.e., objects which might block or otherwise interfere with navigation by the vehicle), combinations thereof, and the like.

In an embodiment, S220 includes applying a neural network in order to determine a number and spatial distribution of features to serve as points of interest. In a further embodiment, the neural network is configured to perform semantic segmentation in order to classify objects shown in the visual content into semantic classes based on features extracted from the visual content.

Each feature is information extracted from visual content such as an image representing one or more characteristics of the image. The features may be numerically represented as sets of descriptors. The descriptors are numerical values extracted from visual content that represent information used for tasks such as image retrieval, object detection, classification, and object identification. In an example implementation, the features include features detected by a fast robust local feature detector such as, but not limited to, oriented Features from accelerated segment test (FAST) and rotated Binary Robust Independent Elementary Features (BRIEF) features, also known as ORB features. In another example implementation, each feature is a pixel of an image.

A feature density, a degree of obstruction, or both may be assigned to each of a set of potential semantic classes according to predetermined values associated with those potential semantic classes such that, by determining one or more semantic classes for different points (e.g., pixels) shown in the visual content, feature densities, degrees of obstruction, or both for those points may be determined based on their respective corresponding semantic classes. In yet a further embodiment, the classifications are predetermined classifications defined based on a degree of obstruction for different kinds of objects, and may be further defined based on average or otherwise expected height (e.g., within a normal height range for a certain type of object), known feature densities, or both.

In some implementations, points of interest may be identified based on predetermined segmentation and making of portions of visual content. As a non-limiting example, markings provided as user inputs may be utilized in order to identify marked points in the visual content as points of interest.

In some embodiments, S220 may include performing an initial segmentation to identify a working area or area of interest within the visual content, and then performing a full semantic segmentation based on portions of the visual content containing the identified areas of interest in order to identify the points of interest in the visual content. In a further embodiment, the full semantic segmentation further results in determining a class for each object represented by one or more of the points of interest in the visual content.

At S220, a feature density for each of multiple different objects within the environment is determined, In an embodiment, the feature density for each object is determined based on a semantic segmentation of the object. To this end, S220 may include semantically segmenting the images with respect to semantic classes having corresponding predetermined feature density values. As noted above, a feature density may be determined via semantic segmentation using a known association between certain predefined semantic classes and respective predetermined values representing densities of features. The feature density of each object may be used for determining a co-visibility of a vehicle viewing that object at different points, as discussed further below.

At S230, a degree of obstruction for each of the multiple different objects within the environment is determined. In an embodiment, the degree of obstruction for each object is determined based on a semantic classification of the object as well as a pose of the vehicle relative to each object. As noted above, the degree of obstruction may be determined via semantic segmentation using a known association between certain predefined semantic classes and respective predetermined values representing levels of obstruction. The pose used to determine the degree of obstruction at least includes a height of the vehicle relative to the object at one or more points in time during navigation, where a degree of obstruction for each object with respect to the vehicle may be determined for each point in time during navigation in which the object will be within view of the vehicle.

Using a value representing a level of obstruction of each object and the pose of the vehicle relative to each object at a given point in time, a degree of obstruction caused by each object obstructing a view from the vehicle can be determined for that point in time. This, in turn, allows for effectively predicting a visibility of the vehicle with respect to the environment including those objects can be determined for that point in time, i.e., a visibility representing how well the vehicle can see various portions of the environment subject to obstruction by objects within the environment.

In an embodiment, the degrees of obstruction are determined for objects that are determined to be within view of the vehicle at certain operational points or operational areas including multiple operational points. In a further embodiment, an object is determined to be within view if the object is estimated to be within a threshold distance of the vehicle at a particular operational point or in any of the operational points within an operational area and the object is in line of sight of the vehicle at that point or area as reflected in visual content captured from the point or area.

The operational points may be, for example, predesignated points where the vehicle will operate. The operational points may be collectively arranged as a bounded area including various operational points or as a path along which operational points are distributed (e.g., an expected or proposed navigation path for the vehicle). As a non-limiting example, a robot acting as a lawnmower may be assigned predesignated points corresponding to locations where grass is growing.

At S240, a distance from the vehicle to each of the objects in the environment within view of the vehicle at each operational point of a potential navigation route of the vehicle is determined. In an embodiment, S240 includes determining a pose of each object based on the visual content showing the objects as well as a pose of the vehicle, where the pose of each object and of the vehicle includes at least a location of the respective pose with respect to the environment (e.g., geographic coordinates or otherwise in a coordinate system representing the environment).

At S250, a co-visibility at each operational point is determined based on the determined distances. Each operational point is defined with respect to a pose of the vehicle including, but not limited to, a location within the environment which might be occupied by the vehicle during navigation. The pose further includes an orientation of the vehicle at each operational point.

In an embodiment, the co-visibility at each operational point is realized as a set of features which will be shown in visual content captured by the vehicle at two or more operational points such that those features are effectively visible to the vehicle along a subsection of a path containing those operational points. To this end, S250 includes determining features which can be observed by the vehicle at each operational point based on the pose of the vehicle at the operational point and the degrees of obstruction of objects within view of the vehicle at the operational point in order to determine which features will effectively be visible at each operational point.

In an embodiment, the co-visibility at each operational point is determined based on the feature density of objects that are visible from that operational point as well as a visibility of the objects to the vehicle or the sensor of the vehicle that are visible from different operational points. To this end, in a further embodiment, S250 may include determining such a visibility for each operational point based on the degree of obstruction for each object visible to the vehicle at that operational point.

Such a visibility may be realized as a set of features which are expected to be visible to the vehicle at an operational point. To this end, in a further embodiment, the line of sight between a sensor (e.g., a camera) of the vehicle and the features observed by the sensor (e.g., features reflecting the objects and other portions of the environment surrounding the vehicle) is analyzed in order to identify one or more obstructions. The obstructions are accumulated along the line-of-sight in order to determine a probability of a given feature being visible from a particular operational point. As a non-limiting example, the probability to see a feature over a line of sight can be computed as follows: assume there are N obstructors along the line of sight, the probability of the i'th obstructor to block the line of sight is (defined as) $p_i$ (which is computed based on the obstructions semantic map). As an example, the probability that the line of sight is clear is $(1-p_i) \cdot (1-p_2) \cdot \ldots \cdot (1-p_n)$.

In yet a further embodiment, the determined visibility and the feature densities of the objects visible at each operational point are utilized to determine a predicted set of features which will be effectively visible to the vehicle at each operational point (i.e., considering both the visibility and the density of features for each operational point), which can be compared to sets of features visible to the vehicle at other operational points to determine the co-visibility at each operational point.

At S260, an accuracy of visual-based positioning of a vehicle occupying each operational point is determined. In a further embodiment, S260 includes calculating a drift and relocalization probability for each operational point, and the accuracy of visual-based positioning for each operational point is determined based on the drift and relocalization probability for the operational point. In yet a further embodiment, the accuracy determined for each operational point at S260 is an estimated accuracy of localization calculations for the operational point (e.g., accuracy of SLAM calculations).

Figure 3:
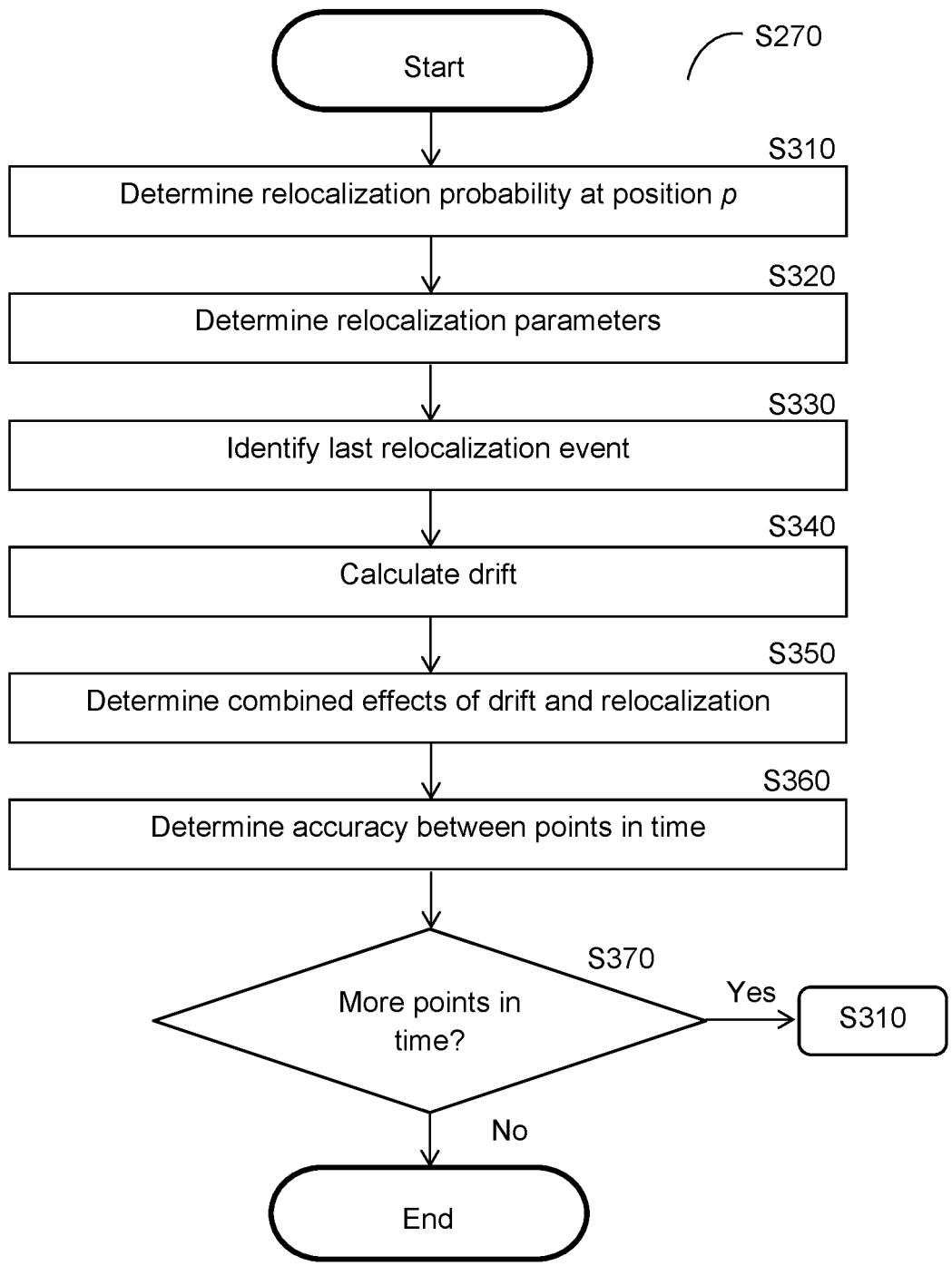
FIG. 3 is a flowchart illustrating a method for estimating visual localization accuracy according to an embodiment.

In an embodiment, the visual navigation performance at each operational point is determined by determining accuracy at operational points as now discussed with respect to FIG. 3. FIG. 3 is a flowchart S260 illustrating a method for estimating visual localization accuracy according to an embodiment.

At S310, a relocalization probability at a given position (e.g., an operational point along a potential navigation path) is determined. In an embodiment, S310 includes identifying locations which were previously observed in visual content corresponding to a current position and computing a location based on how many features were observed in historical visual content for the current position. The relocalization probability indicates a likelihood that a relocalization event has occurred at the position.

In an embodiment, the relocalization probability is determined based on an amount of features in common between the current visual content and the historical visual content for that location as well as respective distributions thereof. The relocalization probability may be proportional to the number of common features, i.e., if the number of common features is higher, it is more likely that a relocalization event has occurred and vice versa (i.e., it is less likely that a relocalization has occurred if the number of common features is lower). In a further embodiment, the features in common are determined between the set of features of the co-visibility and a historical set of features corresponding to the position.

To this end, in a further embodiment, S310 includes identifying key frames and creating descriptors for the identified key frames. Locations of objects may be tracked between key frames and one or more localization techniques (e.g., a SLAM algorithm) may be utilized in order to identify the locations of those objects with respect to the camera that captured the visual content containing the key frames. The result may be a searchable feature vector which can be searched in order to identify common features between key frames of the current visual content and key frames of the historical visual content. An example process for identifying common features between key frames is described further below with respect to FIG. 4.

At S320, relocalization parameters for the given position are determined. In an embodiment, the relocalization parameters include relocalization density and relocalization variance. Each of the relocalization density and relocalization variance may be calculated based on a number of features observed in a given portion of visual content (e.g., a given image captured at a location corresponding to the given position) and a number of historical features observed in one or more historical portions of visual content (e.g., historic images captured at the same location at a historical position), and may be calculated using a respective predetermined function for calculating relocalization density and relocalization variance.

The relocalization density is a number of relocalization events which are expected to occur along a particular path (i.e., the path length between the previous position and the given position such as the path length between capture of images or frames). The relocalization variance is an expected variance of relocalization at the given position.

At S330, the most recent relocalization event is identified based on the relocalization probability. The most recent relocalization event is the latest relocalization event which happened at a position occupied prior to the given position. In an embodiment, S330 further includes determining the position of the most recent relocalization event.

At S340, drift is calculated since a previous position against which the current position is to be compared (e.g., a position at which a most recent previous image or frame was captured before the given position). In an embodiment, the drift is calculated based on a number of features observed with respect to each object and a length of a portion of a path for which each feature was observed between the previous position and the current given position. The drift may be determined based on variance and standard deviation of features observed with respect to each object over that the path length of a portion of the path in which each feature was observed. The drift may be calculated using a predetermined function, for example, a function defined based on empirical data or results of prior simulations indicating correlations between numbers of observed feature and drift.

At S350, the combined effects of drift and relocalization are determined. In an embodiment, the combined effects of drift-related variance and relocalization-related variance are represented as a least-variance combination (LVC) value calculated based on a value representing the drift-related variance and the path length of the distance traveled since the last relocalization event.

In this regard, it has been identified that the accuracy of localization calculations made based on images captured by a vehicle tends to decrease as a result of increases in covariance as the distance between the current location being evaluated (i.e., the location occupied by the vehicle at the given position) of the vehicle and the location of the last localization event increases and that, when a new relocalization event occurs, the covariance drops sharply because the distance between the current location and the location of the relocalization event is reset.

In other words, after a new relocalization event occurs, the next calculation is based on a current location that is the same or very close to the same as that of the last relocalization event. The result is that the accuracy of localization will peak shortly after a relocalization event occurs and then decrease over time until the next relocalization event. The LVC value calculated as described herein accounts for the density of relocalization events, therefore allowing for more effectively determining accuracy of localization calculations for a given position.

By combining the effects of drift over time as measured with respect to relocalization events, the actual effects of covariance can be more accurately estimated as compared to estimations of drift that do not account for relocalization events. As a result, accuracy is better estimated and, consequently, navigation performance can be more accurately estimated. This, in turn, allows for making more accurate navigation decisions for the vehicle.

In an embodiment, the LVC value is determined as a combination of independent measurements that minimizes variance. That is, given independent measurements for drift $\{D_1, D_2, \ldots, D_N\}$ (where D is a value representing a respective independent measurement of drift and N is an integer greater than or equal to 2) where those independent measurements have respective variances $\{v_1, v_2, \ldots, v_N\}$ (where each v is a value representing variance for the respective independent measurement), the combination of independent measurements with the least variance may be determined by calculating the LVC value in accordance with Equation 1 as follows:

$$LVC = \mathrm{Var}(\Sigma_i \alpha_i D_i) \quad \text{Equation 1}$$

In Equation 1, LVC is the least variance combination value, Var is a variance, each $\alpha_i$ is a coefficient determined to minimize variance, and each $D_i$ is an independent measurement of drift. The coefficients $\alpha_i$ are constrained such that $\Sigma_i \alpha_i = 1$ and $\alpha_i \geq 0$. In a further embodiment, the coefficients $\alpha_i$ are calculated in accordance with Equation 2 as follows:

$$\alpha_i = \frac{1}{v_i}\left(\frac{1}{\sum_j \frac{1}{v_j}}\right) \quad \text{Equation 2}$$

In Equation 2, $\alpha_i$ is one of the optimized variance coefficients, $v_i$ is a variance corresponding to a respective independent measurement $D_i$, and j is an index including all of the measurements.

At S360, an accuracy occurring between the given position and a previously occupied position is determined. The accuracy is realized as a variance value for the given position that is determined based a variance value at the previous position and a value representing the combined effects of drift and relocalization (e.g., the LVC value noted above). In a further embodiment, the accuracy between positions is calculated in accordance with the following:

$$A(t+dt)=LVC(A(t)+D,g(\ )*h(\ )) \quad \text{Equation 3}$$

In Equation 3, A(t+dt) is an accuracy value determined for the time t+dt corresponding to the given position (e.g., a time at which the given position was occupied), A(t) is an accuracy value determined for a point in time t corresponding to the previously occupied position, and LVC is the least-variance combination value determined based on the sum of the accuracy A(t) with the calculated drift D and the product of relocalization density with relocalization variance calculated using respective predefined functions g( ) and h( ). The functions g( ) and h( ) may be predefined functions determined based on empirical data or simulations.

At S370, it is determined whether accuracy should be determined with respect to additional positions and, if so, execution continues with S310 where relocalization and drift are analyzed at a new position. In particular, it may be determined whether additional operational points have yet to be analyzed to determine accuracy.

Returning to FIG. 2, at S270, a visual navigation performance of the vehicle is determined by estimating accuracies. The visual navigation performance is based on an expected quality and accuracy of navigation decisions determined based on visual content captured by a camera of the vehicle at a given operational point. In an embodiment, the visual navigation performance may be realized as a value representing an average accuracy along a planned path. This value may be compared, for example, to a required or otherwise desired average accuracy value, in order to determine whether a given path has acceptable accuracy.

In a further embodiment, the visual navigation performance value may be determined as an average of accuracy values determined for different operational points, for example, an average of the accuracy values determined in each iteration of the method described above with respect to FIG. 3. Alternatively, the visual navigation performance may be realized as accuracy values at each of multiple operational points, for example, operational points along a potential navigation path.

In some implementations, the visual navigation performance predicted for different operational points may be provided, for example, to an operator of the vehicle or other entity for which such estimated navigation performance of the vehicle would be relevant. As a non-limiting example, a map or other visual representation of the environment including the operational points may be provided as part of a graphical user interface), and the visual representation of the environment may be visually marked to distinguish areas having different estimated accuracy values or may be interacted with in order to access information related to estimated accuracy.

At optional S280, navigation software to be utilized by the vehicle during a navigation (e.g., for planning paths to be navigated during such navigation) through the operational points is selected based on the estimated navigation performance. In an embodiment, S280 further includes executing the selected navigation software. Alternatively, S280 may further include sending an indication of the selected navigation software, for example from the navigation estimator 130 to the vehicle navigation system 125 in order to communicate that the selected navigation software should be executed in order to plan paths or otherwise make navigation decisions for the vehicle 120 while navigating along the navigation route including the operational points. In some embodiments, S280 may include retrieving the navigation software to be utilized for navigation from a code repository (e.g., the code repository 140).

At optional S290, a navigation path is planned based on the estimated navigation performance. In an embodiment, S290 further includes executing the selected navigation software, for example, via the vehicle navigation system 125. In a further embodiment, S290 includes executing the navigation based on the planned navigation path. This may include, but is not limited to, making navigation decisions at various operations points based on respective estimated accuracies for those operational points.

It should be noted that various embodiments described herein are discussed with respect to a vehicle such as a drone, but that the disclosed embodiments may be equally applicable to any computerized system that navigates regardless of whether that system would be classified as a vehicle. In particular but not in limitation, navigation performance for a robot navigating in an environment may be estimated and utilized to improve navigation in accordance with the disclosed embodiments regardless of whether a person having ordinary skill in the art would consider such a robot as a vehicle or not.

Figure 4:
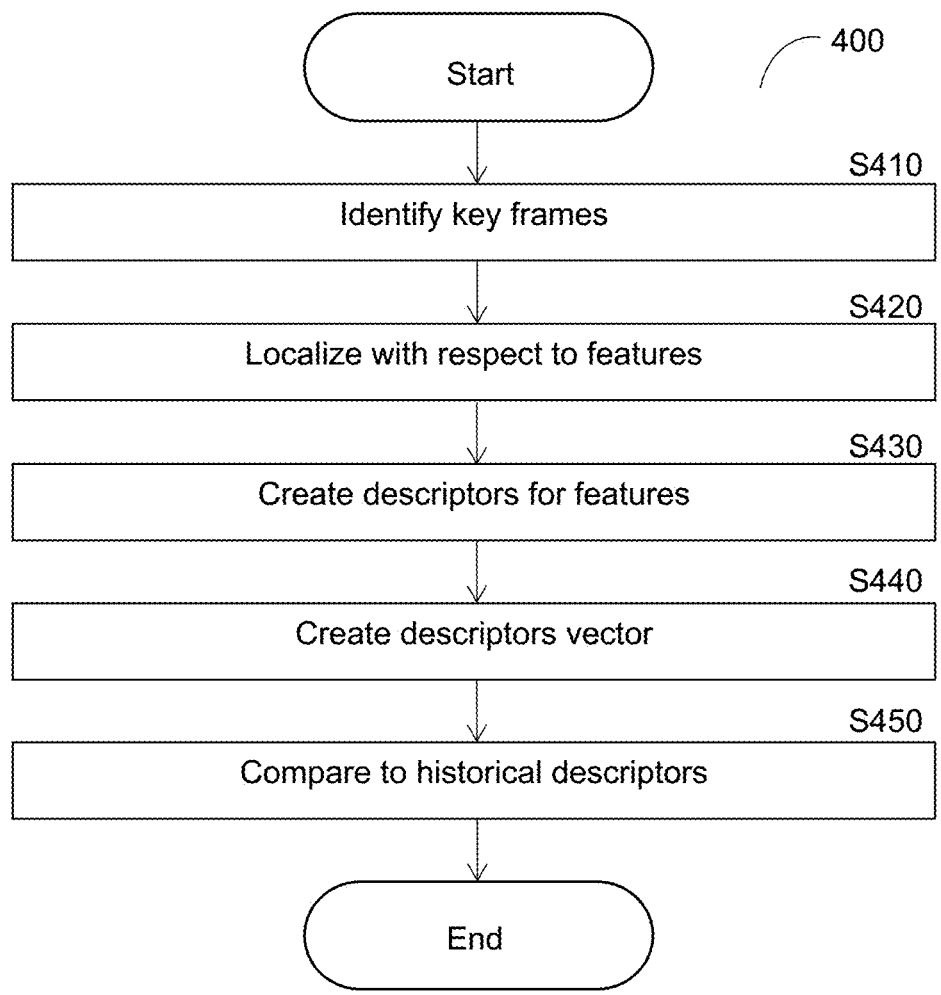
FIG. 4 is a flowchart illustrating a method for identifying common features between key features according to an embodiment.

FIG. 4 is an example flowchart 400 illustrating a method for identifying common features between key frames according to an embodiment. In an embodiment, the method may be performed by the navigation estimator 130 or the vehicle navigation system 125.

At S410, key frames are identified in a portion of visual content. In an embodiment, each key frame is different from one or more preceding frames (e.g., immediately preceding frames) above a threshold. The difference may be based on, for example, differences in pixels between frames. In some implementations, values representing respective differences between corresponding sets of pixels may be aggregated into a single difference value, and each key frame having a difference value above a threshold is identified as a key frame.

At S420, localization is performed with respect to features in the identified key frames. In an embodiment, S420 includes using a features-based localization algorithm such as a features-based simultaneous localization and mapping (SLAM) algorithm based on features such as pixels in the identified key frames. The result of the features-based localization includes tracking the location of objects between key frames and identifying the relative locations of those objects as well as of the camera which captured the visual content including the key frames showing those objects.

At S430, descriptors are created with respect to the features in the identified key frames. The descriptors are numerical values representing aspects of the image.

At optional S440, a descriptors vector is created. The descriptions vector includes the descriptors for corresponding features, and may be a searchable vector in order to allow for subsequent searching.

At S450, the current descriptors created at S430 are compared to historical descriptors. In an embodiment, S450 includes matching between the current descriptors and historical descriptors of a corresponding portion of visual content (e.g., a portion of historical visual content corresponding to the same location as the portion of visual content for which the current descriptors were created). In some embodiments, the current descriptors vector and the historical descriptors vector are searched for features, and the results of the searches are compared between the current descriptors vector and the historical descriptors vector.

Figure 5:
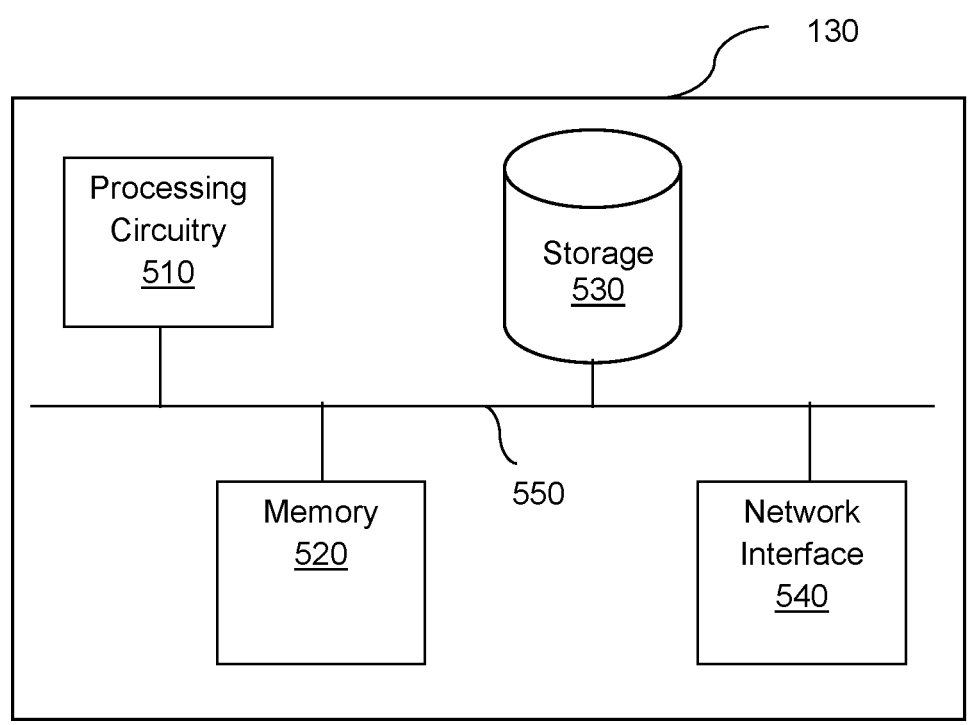
FIG. 5 is a schematic diagram of a navigation estimator according to an embodiment.

FIG. 5 is an example schematic diagram of a navigation estimator 130 according to an embodiment. The navigation estimator 130 includes a processing circuitry 510 coupled to a memory 520, a storage 530, and a network interface 540. In an embodiment, the components of the navigation estimator 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the navigation estimator 130 to communicate with, for example, the vehicle 120, the code repository 140, the image database 150, or a combination thereof.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for path navigation accuracy estimation, comprising:
 determining a degree of obstruction for each of a plurality of objects shown in visual content, wherein the degree of obstruction for each of the objects represents a degree to which the object will obstruct visibility by a vehicle capturing visual content in an environment where the vehicle is navigating and the plurality of objects are disposed;
 determining, for each of a plurality of operational points, a co-visibility of the vehicle at the operational point based on a pose of the vehicle at the operational point and the degree of obstruction for each of the objects which is within view of the vehicle at the operational point; and estimating a visual navigation performance at each of the operational points based on the co-visibility determined for the operational point, wherein estimating the visual navigation performance for each of the operational points further comprises estimating, for each of the operational points, an accuracy of visual navigation at the operational point based on drift between the operational point and a location of a most recent relocalization event which occurred by the vehicle prior to the operational point, wherein the location of the most recent relocalization event is determined for each of the operational points based on the co-visibility of the vehicle at the operational point; and adapting navigation of the vehicle based on the visual navigation performance estimated at each of the operational points.

2. The method of claim 1, further comprising:

planning a navigation path based on the estimated visual navigation performance at each of the operational points such that an average of the estimated accuracies is above a threshold.

3. The method of claim 1, further comprising:

selecting at least one navigation software for use in navigating by the vehicle based on the estimated accuracies; and causing the selected at least one navigation software to be used by the vehicle during navigation.

4. The method of claim 1, wherein the co-visibility includes a set of features, further comprising:

determining a relocalization probability for each of the operational points based on an amount of features in common between the set of features of the co-visibility and a historical set of features corresponding to the operational point, wherein the most recent relocalization event for the operational point is determined based further on the relocalization probability for the operational point.

5. The method of claim 1, wherein estimating the accuracy of visual navigation at each of the operational points further comprises:

determining a least variance combination (LVC) value for the operational point based on a plurality of independent drift measurements and a variance associated with each of the plurality of independent drift measurements, wherein the accuracy of visual navigation at each of the operational points is estimated based further on the LVC value for the operational point.

6. The method of claim 5, wherein the LVC value for each of the operational points is determined based further on a respective relocalization density and a respective relocalization variance, wherein the relocalization density for each of the operational points is a number of relocalization events expected to occur along a length of path between a previous position and the operational point, wherein the relocalization variance for each of the operational points is an expected variance of relocalization at the operational point.

7. The method of claim 1, wherein determining the degree of obstruction for each of the objects shown in the visual content further comprises:

semantically segmenting the visual content in order to determine a semantic class of the object, wherein the degree of obstruction for the object is determined based further on the semantic class of the object.

8. The method of claim 7, wherein the semantic class used to determine the degree of obstruction for each of the objects is a first semantic class, further comprising:

determining a second semantic class of each of the objects; and determining a feature density for each of the objects based on the second semantic class of the object, wherein the co-visibility of the vehicle at each of the operational points is determined based further on the feature density for each of the objects which is within view of the vehicle at the operational point.

9. A non-transitory computer readable medium having stored thereon instructions for causing a processing circuitry to execute a process, the process comprising:

determining a degree of obstruction for each of a plurality of objects shown in visual content, wherein the degree of obstruction for each of the objects represents a degree to which the object will obstruct visibility by a vehicle capturing visual content in an environment where the vehicle is navigating and the plurality of objects are disposed;

determining, for each of a plurality of operational points, a co-visibility of the vehicle at the operational point based on a pose of the vehicle at the operational point and the degree of obstruction for each of the objects which is within view of the vehicle at the operational point; and estimating a visual navigation performance at each of the operational points based on the co-visibility determined for the operational point, wherein estimating the visual navigation performance for each of the operational points further comprises estimating, for each of the operational points, an accuracy of visual navigation at the operational point based on drift between the operational point and a location of a most recent relocalization event which occurred by the vehicle prior to the operational point, wherein the location of the most recent relocalization event is determined for each of the operational points based on the co-visibility of the vehicle at the operational point; and adapting navigation of the vehicle based on the visual navigation performance estimated at each of the operational points.

10. A system for using navigation accuracy estimations, comprising:

a processing circuitry; and a memory, the memory containing instructions that, when executed by the processing circuitry, configure the system to:

determine a degree of obstruction for each of a plurality of objects shown in visual content, wherein the degree of obstruction for each of the objects represents a degree to which the object will obstruct visibility by a vehicle capturing visual content in an environment where the vehicle is navigating and the plurality of objects are disposed;

determine, for each of a plurality of operational points, a co-visibility of the vehicle at the operational point based on a pose of the vehicle at the operational point and the degree of obstruction for each of the objects which is within view of the vehicle at the operational point; and estimate a visual navigation performance at each of the operational points based on the co-visibility determined for the operational point, wherein the system is further configured to estimate, for each of the operational points, an accuracy of visual navigation at the operational point based on drift between the operational point and a location of a most recent relocalization event which occurred by the vehicle prior to the operational point, wherein the location of the most recent relocalization event is determined for each of the operational points based on the co-visibility of the vehicle at the operational point; and adapt navigation of the vehicle based on the visual navigation performance estimated at each of the operational points.

11. The system of claim 10, wherein the system is further configured to:

plan a navigation path based on the estimated visual navigation performance at each of the operational points such that an average of the estimated accuracies is above a threshold.

12. The system of claim 10, wherein the system is further configured to:

select at least one navigation software for use in navigating by the vehicle based on the estimated accuracies; and cause the selected at least one navigation software to be used by the vehicle during navigation.

13. The system of claim 10, wherein the co-visibility includes a set of features, wherein the system is further configured to:

determine a relocalization probability for each of the operational points based on an amount of features in common between the set of features of the co-visibility and a historical set of features corresponding to the operational point, wherein the most recent relocalization event for the operational point is determined based further on the relocalization probability for the operational point.

14. The system of claim 10, wherein the system is further configured to:

determine a least variance combination (LVC) value for the operational point based on a plurality of independent drift measurements and a variance associated with each of the plurality of independent drift measurements, wherein the accuracy of visual navigation at each of the operational points is estimated based further on the LVC value for the operational point.

15. The system of claim 14, wherein the LVC value for each of the operational points is determined based further on a respective relocalization density and a respective relocalization variance, wherein the relocalization density for each of the operational points is a number of relocalization events expected to occur along a length of path between a previous position and the operational point, wherein the relocalization variance for each of the operational points is an expected variance of relocalization at the operational point.

16. The system of claim 10, wherein the system is further configured to:

semantically segment the visual content in order to determine a semantic class of the object, wherein the degree of obstruction for the object is determined based further on the semantic class of the object.

17. The system of claim 16, wherein the semantic class used to determine the degree of obstruction for each of the objects is a first semantic class, wherein the system is further configured to:

determine a second semantic class of each of the objects; and determine a feature density for each of the objects based on the second semantic class of the object, wherein the co-visibility of the vehicle at each of the operational points is determined based further on the feature density for each of the objects which is within view of the vehicle at the operational point.

* * * * *